United States Patent [19]
Brennan, Jr.

[11] Patent Number: 5,451,938
[45] Date of Patent: Sep. 19, 1995

[54] RF METER READING SYSTEM

[75] Inventor: William J. Brennan, Jr., Montgomery, Ala.

[73] Assignee: Schlumberger Industries, Inc., Norcross, Ga.

[21] Appl. No.: 141,840

[22] Filed: Oct. 22, 1993

[51] Int. Cl.⁶ .................................................. G08C 15/08
[52] U.S. Cl. ........................... 340/870.14; 340/870.02; 340/870.18; 375/282; 375/369
[58] Field of Search ............... 340/870.02, 870.03, 340/825.54, 870.14, 870.18, 870.19; 375/117, 87, 282, 284, 293, 369; 370/48; 358/438, 409, 413

[56] References Cited

U.S. PATENT DOCUMENTS

| | | | |
|---|---|---|---|
| 3,754,250 | 8/1973 | Bruner | 340/870.03 |
| 3,961,137 | 6/1976 | Hutt et al. | 375/117 |
| 4,406,924 | 9/1983 | Dorey | 340/870.02 |
| 4,614,945 | 9/1986 | Brunius et al. | 340/870.03 |
| 5,099,348 | 3/1992 | Huddleston et al. | 359/143 |
| 5,239,575 | 8/1993 | White et al. | 340/870.02 |

Primary Examiner—John K. Peng
Assistant Examiner—Daniel J. Wu
Attorney, Agent, or Firm—Sanford J. Asman

[57] ABSTRACT

The RF meter reading system includes a transmitter having an encoder. Meter data is encoded and modulated using a bi-phase modulating scheme. In order to uniquely identify the start of a data transmission, a super start field, which is an "illegal" bi-phase signal is used. The super start field is selected such that it cannot be recognized if transmissions from more than one transmitter are being received by the receiver.

15 Claims, 3 Drawing Sheets

RF METER READING SYSTEM

BACKGROUND OF THE INVENTION

The present invention relates generally to an automatic meter reading system. In particular, the invention relates to a system which uses radio frequency (RF) transmitters to send encoded meter readings to a receiver which is able to collect data from a plurality of such devices.

In an automatic meter reading system, of the type used to read utility meters, it is desirable to have a system in which a meter reader can periodically pass through an area containing a number of meters and collect their data. In the past, systems have existed in which the meters included transponder-like systems. In a typical system known in the prior art, a mobile collector unit, such as a van, would traverse an area collecting data from encoder/receiver/transmitter ("ERT") unit. The ERT units contained an encoder, a receiver, and a transmitter. The radio mounted in the van would transmit a "wake-up" signal which served to cause the ERT units in its proximity to send out their encoded data. Such a system, due to its inclusion of both a transmitter and a receiver, is called a "two-way" system.

As will be understood by those skilled in the art, a simpler, and, thus, less expensive system, in which only the encoder and transmitter were located at the site being monitored would be desireable to minimize costs. However, such a "one-way" system would have to conserve battery power, prevent conflicts in transmissions, and have a receiver/collector unit to identify valid transmissions from identifiable locations.

SUMMARY OF THE INVENTION

The present invention is an RF meter reading system. The system comprises an RF transmitter and an encoder associated with the RF transmitter. Data collected by a meter is encoded by the encoder. The transmitter also encludes a bi-phase modulator which modulates the encoded signal for transmission by the RF transmitter. The modulator generates a synch signal, a start signal, a message signal, and a verification signal. The start signal is a signal which intentionally violates the bi-phase encoding rules, such that it may be identified when the receiver portion of the system receives the transmitter's signal.

The RF meter reading system also includes an RF receiver for receiving transmissions from the transmitter. The receiver decodes the bi-phase modulated signals and identifies the start signal. In addition, the receiver verifies receipt of valid data from said RF transmitter.

The verification of data is preferably accomplished by using a Cyclic Redundancy Check ("CRC") calculation based upon a polynomial which has been selected.

The logic for operating the transmitter and the logic for operating the receiver are contained in respective programmed microprocessor units within each apparatus.

BEST MODE FOR PRACTICING THE INVENTION

Figure 1:
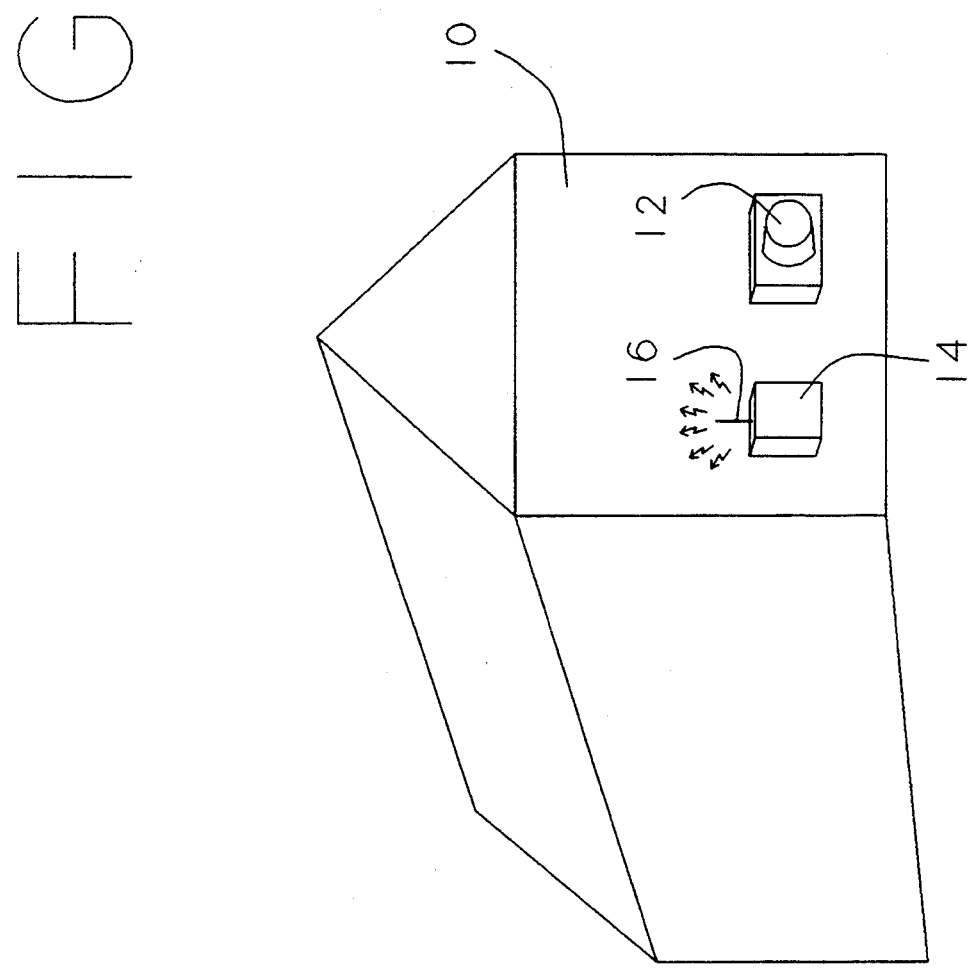
FIG. 1 is a pictorial view of a house having a meter and the transmitter portion of the RF meter reading system of the present invention mounted thereon, together with a pictorial view of a meter reader holding the receiver portion of the RF meter reading system of the present invention.
Figure 1:
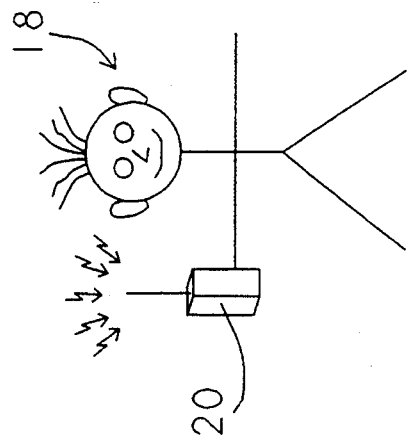

Referring to FIG. 1, a typical meter reading application of the type which the present invention is intended to be used, is shown. Specifically, a house 10 has a meter 12, such as a standard electricity meter, mounted thereon. While an electricity meter is used to illustrate one application of the present invention, it will be clear to those skilled in the art that the present invention may be used to transmit data from other devices, such as water meters and gas meters.

The meter 12 includes an encoder apparatus (not shown) which is able to encode data supplied by the meter. For example, the encoder apparatus might encode watt-hours, in the case of an electricity meter; gallons, in the case of a water meter; or cubic feet, in the case of a gas meter. Also, while the present invention is being described with reference to its use with a single electricity meter, those skilled in the art will recognize that multiple meters and/or types of meters could supply encoded data to a single transmitter, such as the transmitter 14, which is shown to be mounted on the side of the house 10.

While the transmitter 14 is shown to be mounted on the side of the house 10, and to be separated from the meter 12, the transmitter 14 could be incorporated into a single meter/encoder/transmitter apparatus, and the transmitter could be mounted in some other location, i.e., within the pit in which a water meter is mounted. Another alternative to that described, would be the inclusion of the encoder device within the housing of the transmitter 14. Thus, as long as the meter 12 is able to supply data, either encoded or in some other form, i.e., pulses, it does not matter where the encoding actually takes place.

While not shown in FIG. 1, it will be obvious to those skilled in the art that there is some connection between the meter 12 and the transmitter 14. While it is contemplated that such connection will most normally take the form of a wired connection, it is within the scope of the present invention to use some other type of data transfer, i.e., optical port, RF, or power line carrier.

The transmitter 14 preferably includes an antenna 16, designed for use in the RF band used by the transmitter 14. While there is no preferred RF band for the purpose of the present invention, it is generally preferred to use some RF frequency range for which no FCC license is required. By way of example the 914 MHz band has been found to be suitable.

In accordance with the present invention, data is continuously collected by the meter 12. The encoded data is periodically transferred to the transmitter 14 at a first timing interval. For example, in the case of a water meter having a separate encoder, the encoded data may be transferred to the transmitter every 12 hours. On the other hand, in the case of an electricity meter in which the encoder is built into the transmitter 14, and in which pulses are sent to the transmitter/encoder as a predetermined amount of electricity consumption has occurred, the first timing interval may be substantially less than one second. The important aspect of this portion of an understanding of the invention is that a meter collects data corresponding to consumption; the data is encoded; and the encoded data is periodically sent to the transmitter at a first timing interval. Note that in the case of pulses sent by an electricity meter, the first timing interval may not be a uniform timing interval.

In the preferred embodiment of the invention, the transmitter 14 periodically transmits a modulated RF signal which includes the encoded data from the meter 12. This periodic transmission occurs at a second timing interval, which is somewhat randomly selected to occur at relatively frequent intervals. For example, the second timing interval might be on the order of about once every 12 seconds, but may actually occur in the range of about once every 8 to 24 seconds. As will be explained more fully hereinafter, it is desireable for the second timing interval to occur fairly frequently. It is also desireable for the second timing interval to be nonuniform, for reasons to be made clear hereinafter.

With continued reference to FIG. 1, a meter reader 18, illustrated as a stick figure, is shown to be carrying a handheld data collector 20. The data collector 20 includes an RF receiver tuned to receive data from the transmitter 14. If the house 10 were the only location from which metered data was to be transmitted, it would only be necessary for the meter reader 18 to bring the data collector 20 to a location from which reliable data transfer from the transmitter 14 to the data collector 20 could occur. However, in view of the fact that the data collector 20 would typically be within reception range from any one or more of numerous houses which are similarly equipped with meters and transmitters, it is necessary to have an RF meter reading system which allows the data collector 20 to identify the particular transmitter 14 from which data is being received to the exclusion of any other transmitter which may be simultaneously transmitting data. The present invention provides a reliable system for transmitting and receiving RF data from a plurality of locations, while permitting the data collector 20 to properly collect data from only a single transmitter 14 at a time.

Figure 2:
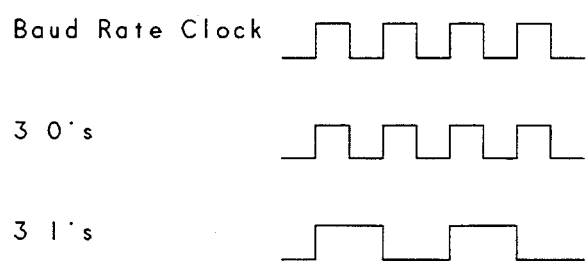
FIG. 2 is diagram showing a typical bi-phase encoding scheme of the type used in the present invention.

Before detailing the manner in which the present invention operates, it will be helpful to describe the bi-phase encoding scheme used by the invention. With reference to FIG. 2, data will be transmitted at some predetermined baud rate, i.e., 1200 baud. A baud rate clock signal can consist of a square wave which transitions from a high level to a low level at a period determined by the baud rate. As used herein the term "bit time" refers to a complete cycle of the baud rate clock, i.e., the time between transitions from low to high signals.

By definition, we will call a data transmission which includes a change from a high signal to a low signal (or, alternatively, from a low signal to a high signal) within a bit time to be a "0". Similarly, by definition, we will call a data transmission which includes no change in signal, i.e., a low signal remains low (or, alternatively, a high signal remains high) within a bit time to be a "1". Finally, to be a valid data signal, there must be a transition (i.e., high to low or low to high) at the beginning of each bit time. With reference to FIG. 2, the foregoing rules of data transmission are illustrated. These rules and FIG. 2 illustrate what those of ordinary skill in the art refer to as "bi-phase" encoding. Such encoding, as is illustrated in FIG. 2, is not unique to the present invention.

A problem with using bi-phase encoding in an RF data transmission system of the type described is that the data collector 20 may be simultaneously picking up transmissions from multiple sites. While there may be any number of solutions to the problem of uniquely identifying the site from which the data is emanating, the present invention presents a cost effective RF meter reading system which allows a large number of transmitters to transmit data which can be received and identified by data collectors. Using the present RF meter reading system, the transmitters can be inexpensive low-power transmitters, which do not require any reception capability.

Figure 3:
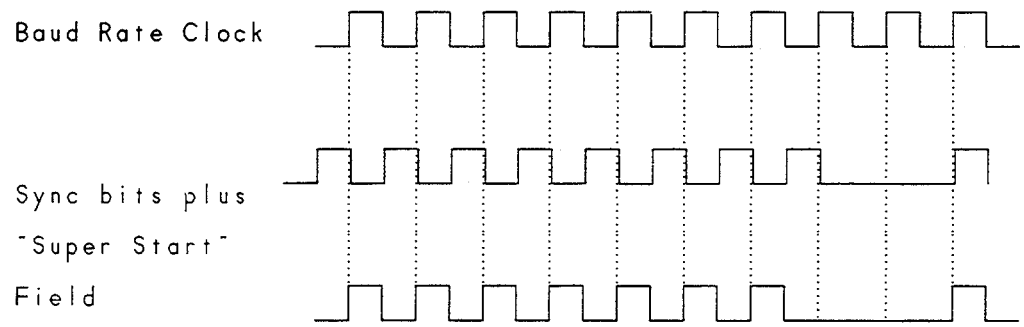
FIG. 3 is diagram illustrating the manner in which a transmitter in the RF meter reading system of the present invention sends out a "Super Start" field to permit a receiver to sync with the data to be transmitted.

Referring now to FIG. 3, RF circuitry within the data collector 20 is able to receive signals from the transmitter 14. The collector 20 contains additional circuitry which is able to synchronize with the signals being transmitted. As there is no way for the collector 20 to know whether a particular signal is noise, or whether it is a combination of signals from multiple sites, a first feature of the present RF meter reading system is its ability to validate a message from transmitter 14 if and only if a complete message is received from transmitter 14. For the purpose of describing the preferred embodiment of the invention, a complete message consists of a Sync signal, a Start signal, a Data Message, and a Verification signal. These may be referred to schematically as:

<Sync> <Start> <Message> <Verification>

Thus, with continued reference to FIG. 3, the Sync signal which is preferably used consists of the transmission of a plurality of "0"'s. In the preferred embodiment of the invention, a series of 8 "0"'s are transmitted as the Sync signal. However, other signals could be used, so long as the collector 20 is able to identify that it is receiving data, and it is able to synchronize itself to the baud rate of the data being transmitted.

A unique aspect of the present invention is that it uses a Start signal, referred to in FIG. 3 as a "Super Start Field". With reference to FIG. 3, the Super Start Field of the preferred embodiment of the invention is comprised of a low signal which does not change for two bit times. Thus, based upon the above definitions, a Super Start Field is an "illegal" transmission, i.e., it is neither a "0" nor a "1" as defined above. Yet, by using the Super Start Field, it is possible for a collector 20 to determine that it is receiving data from only a single transmitter. This is true, because if data from multiple transmitters were being received by the collector 20, the Super Start Field (consisting of a low signal for two bit time duration) would be overridden by a high signal from the transmission of either a "0" or a "1", either of which would include a high signal within the two bit time period of the Super Start Field. Similarly, if there was RF "noise" being received by the collector 20, a valid Super Start Field would not be identified by the collector. Thus, the absence of a valid Super Start Field prevents the data collector 20 from seeking to identify a valid Message, i.e., the collector 20 will continue to seek out a valid Super Start Field until one has been received.

Upon the receipt of a valid Super Start Field, the collector 20 will receive and interpret the Message data. For the purpose of the present invention, the specific content of the Message data is not relevant. Suffice it to say, that the Message data will typically include data regarding both the identity of the transmitter and the encoded meter data.

Verification data will follow the Message data. Verification data typically consists of a Cyclic Redundancy Check ("CRC"). This is a number which is computed using an appropriate polynomial. The CRC computation is based upon the Message data. Accordingly, if the collector 20 computes the same CRC as it receives from the transmitter 14 as the Verification part of the transmission, then the collector 20 can assume that it has received valid data from the transmitter 14. Alternatively, if the Verification data does not correspond to the same CRC which the collector 20 has calculated for what the collector 20 presumed to be valid Message data, then the collector 20 will not further process the Message data, assuming it to be erroneous.

In view of the unique aspects of the present invention, it is possible for a single meter reader 18 equipped with a single collector 20 to collect data from a large number of meter sites.

Figure 4:
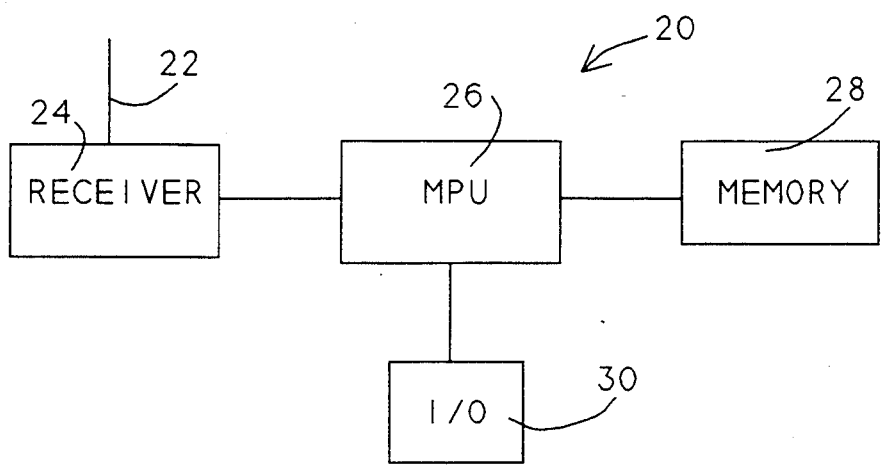
FIG. 4 is a block diagram of the collector (receiver) used in the present invention.

Referring now to FIG. 4, a block diagram of the collector 20 used in the present invention is shown. The collector 20 includes an antenna 22 for receiving signals which are then processed by a receiver 24. In the preferred embodiment of the invention, the receiver operates in the 914 MHz frequency band, but other frequencies could be used. Signals received by the receiver 24 are processed by a programmed microprocessor unit (MPU) 26. It is the job of the MPU 26 to verify and collect data conforming to the specifications set forth above. In performing that function, the MPU 26 continuously watches for the presence of a Super Start Field. Upon recognizing a Super Start Field, the MPU 26 collects data, and upon the receipt of a proper CRC, the MPU 26 stores the data in a memory unit 28. The collector 20 further contains input/output circuitry (I/O) 30 which is used to upload data, such as the software to run the collector 20, and to download meter data from the collector 20, i.e., to a central billing computer.

The software in the collector 20 includes all of the software needed to run the collector 20, to collect and verify data, and to determine which data should be stored in the memory unit 28. For example, if the Message data from water meters contains an identifier which identifies the data as coming from a water meter, and the collector 20 receives and verifies data whose identification indicates something other than a water meter, i.e., a gas or electricity meter, then the MPU 26 would not store that data in memory 28.

As will be obvious to those skilled in the art, if the collector 20, while in the process of collecting data is unable to properly verify the data, i.e., the CRC is invalid, then the collector 20 will restart the process of looking for a Super Start Field.

Another aspect of the operation of the collector 20 of the preferred embodiment of the invention is that it has the ability to automatically adjust the gain of the signal which is being received. Thus, if more than one transmitter is simultaneously transmitting, the automatic gain control of the receiver 24 will adjust itself to listen to a signal which is 10 dB stronger than other signals being received and to disregard the other signals which are below the threshold which the receiver 24 can listen.

This feature means that as the meter reader 18 approaches a particular transmitter, the approached transmitter will appear to provide a much stronger signal than for any transmitter away from which the meter reader 18 is moving. This is true, because as one doubles one's distance from a transmitter, the strength of its signal decreases by 6 dB. Simultaneously, as one halves one's distance to another transmitter, its apparent signal strength increases by 6 dB.

Figure 5:
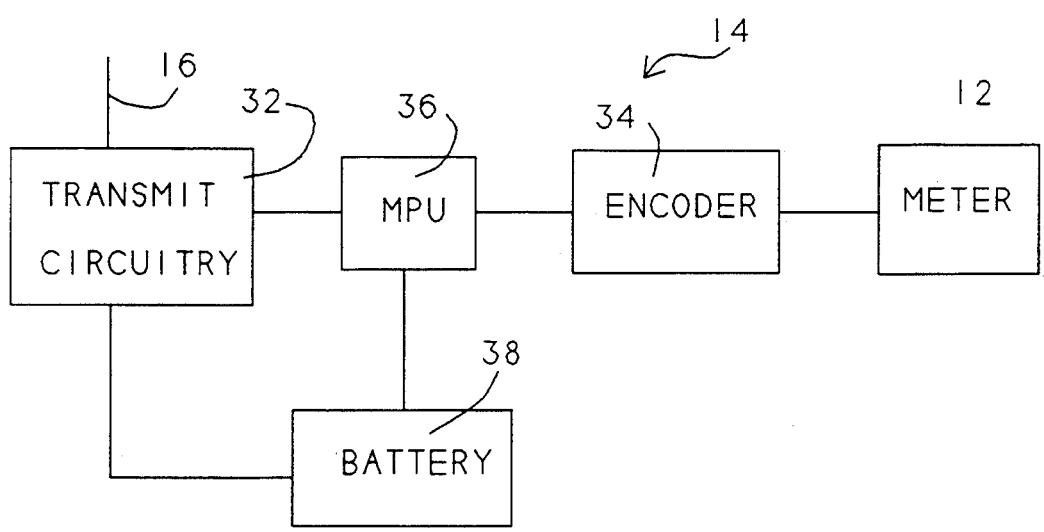
FIG. 5 is a block diagram of the transmitter used in the present invention.

Referring now to FIG. 5, a block diagram of the transmitter 14 used in the present invention is shown. The transmitter 14 includes an antenna 16 for transmitting signals from transmit circuitry 32. In the preferred embodiment of the invention, the signals transmitted correspond to data which originated from a meter 12, which is connected to an encoder 34. The encoded data is processed by a preprogrammed microprocessor unit ("MPU") 36 to be bi-phase modulated, such that it includes the data in the format set forth above. Thus, the data transmitted by transmitter 14 consists of a Sync signal, followed by a Super Start Field, Message data, and Verification data in the form of a CRC. In the preferred embodiment of the invention, the particular CRC polynomial used is $X8+X5+X3+1$, although other CRC polynomials are known and other verification schemes could be used.

In order to conserve the life of a battery 38 within the transmitter 14, the MPU 36 is awakened periodically. This periodic awakening preferably occurs about once every 8 seconds. In the preferred embodiment of the invention, the timing of data transmissions following each "wake up" signal is based upon a pseudorandom code which alters the timing in a pseudorandom manner, in order to help insure that two or more transmitters which are in close proximity to one another will not inadvertently keep overriding one another's signals. In the preferred embodiment of the invention, the transmission may occur at the time of the "wake up" signal, or it may be delayed until the next "wake up" signal. In addition, the 8 second nominal period between "wake up" signals may be varied based upon a pseudorandom number. As the actual data transmission typically takes on the order of substantially less than one second, such Pseudorandom timing of transmissions has proven to be satisfactory in avoiding continued simultaneous transmissions from multiple transmitters in close proximity to one another.

I claim:

1. A radio-frequency meter reading system, comprising:
   (a) a radio-frequency transmitter;
   (b) encoder means associated with said radio-frequency transmitter for collecting data from a meter; and
   (c) a bi-phase modulator means for modulating the data from said encoder means into an information signal which is transmitted by said radio-frequency transmitter, said information signal representing a first logical value of said data with a first logical level signal and a second logical value of said data with a second logical level signal and said information signal including a synch signal, a start signal, a message signal, and a verification signal;
   wherein said start signal comprises a signal which contains neither said first logical level signal nor said second logical level signal.

2. The radio-frequency meter reading system of claim 1, further comprising:

(a) a radio-frequency receiver containing means for receiving said information signal from said radio-frequency transmitter;

(b) means for decoding said information signal into said data;

(c) means for identifying said start signal; and (d) means for verifying receipt of valid data from said radio-frequency transmitter.

3. The radio-frequency reading system as set forth in claim 1, wherein said encoding means comprises a microprocessor.

4. The radio-frequency reading system as set forth in claim 1, wherein said first logical level signal has a first frequency, said second logical level signal has a second frequency, and said start signal is at a fixed value.

5. The radio-frequency reading system as set forth in claim 1, wherein said information signal is emitted at periodic intervals.

6. The radio-frequency reading system as set forth in claim 5, wherein said periodic intervals are at irregular intervals.

7. The radio-frequency reading system as set forth in claim 1, wherein said radio-frequency transmitter is battery powered.

8. The radio-frequency reading system as set forth in claim 2, wherein said verifying means performs a cyclic redundancy check on said data.

9. A radio-frequency receiver for receiving an information signal from each of a plurality of radio-frequency transmitters, comprising:

(a) an antenna for detecting said information signal from each of said radio-frequency transmitters;

(b) means for receiving said information signal and for synchronizing a decoding unit to a frequency of a synch signal contained within said information signal;

(c) means for identifying a start signal within said information signal; and (d) said decoding unit for decoding said information signal into data;

said information signal representing a first logical value of said data as a first logical level signal and a second logical value of said data as a second logical level signal;

wherein said decoding unit determines that said information signal is from only one of said radio-frequency transmitters when said start signal is received without having either said first logical level signal or said second logical level signal.

10. The radio-frequency receiver as set forth in claim 9, wherein each of said radio-frequency transmitters are associated with a respective utility meter and said data decoded from said information signal indicates a reading of said utility meter.

11. The radio-frequency receiver as set forth in claim 9, wherein said decoding unit comprises a microprocessor.

12. The radio-frequency receiver as set forth in claim 9, further comprising means for receiving a verification signal and for verifying that said data is valid data based upon said verification signal.

13. The radio-frequency receiver as set forth in claim 9, further comprising a memory for storing said data from each of said radio-frequency transmitters.

14. The radio-frequency receiver as set forth in claim 9, wherein said receiving means automatically adjusts a gain of said information signal.

15. A radio-frequency meter transmitting apparatus, comprising:

(a) a radio-frequency transmitting antenna;

(b) encoder means associated with said radio-frequency transmitting antenna for collecting data from a meter; and (c) a bi-phase modulator means for modulating the data from said encoder means into an information signal which is transmitted from said radio-frequency transmitting antenna, said information signal representing a first logical value of said data with a first logical level signal and a second logical value of said data with a second logical level signal and said information signal including a synch signal, a start signal, a message signal, and a verification signal;

wherein said start signal comprises a signal which contains neither said first logical level signal nor said second logical level signal.

* * * * *